United States Patent [19]

Numata

[11] Patent Number: 4,830,151
[45] Date of Patent: May 16, 1989

[54] DAMPER COMPRISING ROTOR SHAFT AND GEAR SLEEVE HAVING EQUAL EXTERNAL DIAMETER PORTIONS WITH CLUTCH SPRING WOUND THEREABOUT

[75] Inventor: Masanori Numata, Kanagawa, Japan

[73] Assignee: Nifco, Inc., Yokohama, Japan

[21] Appl. No.: 185,722

[22] Filed: Apr. 25, 1988

[30] Foreign Application Priority Data

Apr. 30, 1987 [JP] Japan ............................. 62-64069[U]

[51] Int. Cl.⁴ ...................... F16D 57/00; F16D 57/02; F05F 5/08; B60K 41/24
[52] U.S. Cl. ........................................ 188/290; 16/82; 16/85; 188/291; 192/12 A; 192/12 BA; 192/41 S; 267/155
[58] Field of Search ........... 188/290, 291, 293, 264 E, 188/322.5, 82.1, 82.34; 16/82, 85, 62, DIG. 9, DIG. 10, DIG. 17, 52; 192/12 BA, 41 S, 43, 58 B, 12 A; 49/379; 267/155; 360/96.6

[56] References Cited

U.S. PATENT DOCUMENTS 4,365,525 12/1982 Imazaike ...................... 360/96.6 X
4,697,673 10/1987 Omata .............................. 188/290 X

FOREIGN PATENT DOCUMENTS 61-24850 2/1986 Japan .

Primary Examiner—Robert J. Oberleitner
Attorney, Agent, or Firm—Schwartz & Weinrieb

[57] ABSTRACT

A damper for damping rotation has a construction in which a rotor having a braking plate immersed in oil disposed within a casing and a gear are coupled together by a means of a clutch spring in the form of a coil spring. When the gear is rotated in one direction, it is coupled with the rotor as a result of diametrical contraction of the spring, and a restoring force is stored within the clutch spring, thus producing a resistance against rotation. When it is rotated in the opposite direction, the restoring force of the clutch spring is released so as to permit free rotation of the gear. The coil spring is coiled about a shouldered portion of the rotor shaft and a lower portion of a gear sleeve, supporting the gear, which have the same diametrical extent. In this manner, projecting end portions of the spring, upon which excessive loads have been impressed within the prior art, are able to be eliminated thereby providing extended service life to the spring and damper assembly.

10 Claims, 2 Drawing Sheets

FIG.1
FIG.2
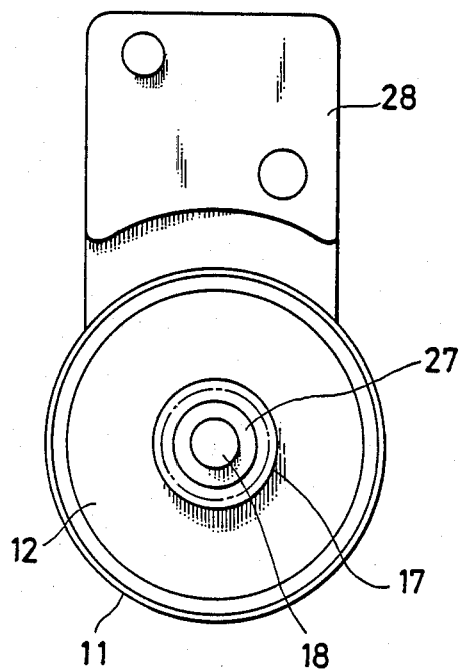
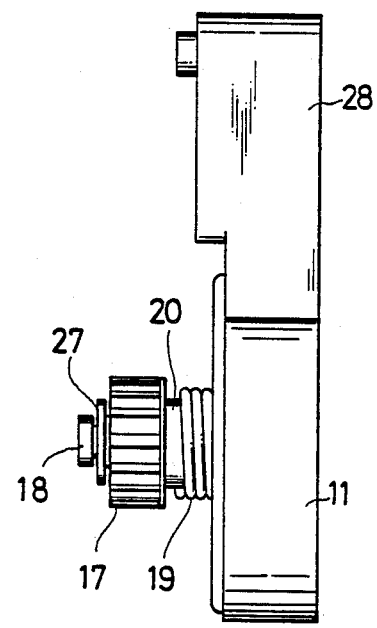

DAMPER COMPRISING ROTOR SHAFT AND GEAR SLEEVE HAVING EQUAL EXTERNAL DIAMETER PORTIONS WITH CLUTCH SPRING WOUND THEREABOUT

BACKGROUND OF THE INVENTION

1. Field of the Invention

This invention relates to dampers for damping the opening motion of motor car dashboard doors or the doors of tape cassette cases built into video tape recorder (VTR) decks.

2. Description of the Prior Art

A motor car dashboard door or the door of a cassette case of a VTR deck has a hinge section spring-biased in the opening direction. When the dashboard door or case door is unlatched, it automatically opens under the influence of the biasing spring. However, if the opening operation relies upon the spring biasing force alone, sudden opening of the door and noise generation are liable to occur and, in the case of a cassette case, the cassette tape may be inadvertently ejected as a result of a shock to the case.

Accordingly, a damper is usually built into a hinge section of the dashboard door or case door in order to damp the biasing force of the spring and obtain a gentle and quiet opening operation.

The main purpose of the damper is to reduce the shock that would otherwise be experienced by means of the dashboard door or case door which is spring-biased in the opening direction when the dashboard door or case door is opened. When closing the dashboard door or case door, no damping action is needed since the dashboard door or case door is closed against the biasing force of the spring as well as its own weight, which may be controlled by the operator's hand. For this reason, the damper to be employed may be a one-way damper, that is, a damper having the function of damping rotation in only one direction.

There are different types of prior art one-way dampers. Among these dampers, the most typical one is that disclosed in Japanese Patent Public Disclosure No. SHO 61-24850. In this well-known one-way damper, as shown in FIG. 4, oil 2 is retained within a casing 1, and a braking plate 4 of a rotor 3 is immersed within the oil 2. A gear 6 is rotatably supported upon a shaft 5 of the rotor 3. A clutch spring 7 is provided upon the rotor shaft 5 and has an engagement portion 7a formed at one end, which is engaged within a slit 8 formed within the gear 6.

In use, when the gear 6 is rotated in a direction of storing a restoring force within the spring 7, the engagement portion 7a at one end of the spring 7 is also rotated so as to store a restoring force within the spring. This stored restoring force has the effect of restricting rotation of the rotor shaft 5 and offering a rotational resistance against the rotation of the gear 6. When the gear 6 is rotated in the opposite direction, the restoring force is released, thus causing slippage of the spring 7 upon the outer periphery of the rotor shaft 5 thereby releasing the resistance offered by means of the rotor 3.

This damper is a perfect one-way damper based upon the action of the clutch spring 7. However, it has the drawback that when the gear is coupled to the rotor, the torque of the gear is concentrated upon the engagement portion 7a of the spring 7, so that the engagement portion is liable to be elongated or broken. When the damper is installed as a means for damping the opening operation of a door, the door is liable to be forcibly opened by means of the operator's hand during the opening operation. In such a case, the engagement portion of the clutch spring is subject to damage, thereby destroying the damping function thereby.

OBJECT OF THE INVENTION

An object of the invention is to provide a one-way damper which is free from the local concentration of load upon the clutch spring thereof, capable of withstanding normal operational abuse and is highly reliable in operation.

SUMMARY OF THE INVENTION

To attain the above object of the invention, there is provided a damper which comprises a casing with oil accommodated therewithin, a rotor including a braking plate immersed within the oil disposed within the casing and a shaft extending from the center of the braking plate and projecting to the outside of the casing, a gear rotatably supported upon an extension of the shaft of the rotor, the gear including a sleeve facing the shaft and having the same external diameter as that of the shaft, and a clutch spring tightly wound upon the outer periphery of the gear sleeve and the outer periphery of the rotor shaft.

With this construction of the damper according to the invention, in which the rotor and gear are coupled together by means of the clutch spring tightly wound upon the rotor shaft and gear sleeve, as a result of rotation of the gear within the direction of storing a restoring force in the clutch spring, the gear sleeve causes a restoring force to be stored within the clutch spring so as to thereby radially contract the same and couple it to the rotor shaft. The rotor is thus rotated together with the gear and offers a resistance against the rotation. When the gear is rotated in the opposite direction, the spring is unwound, that is, the stored restoring force is released. The gear is therefore decoupled from the rotor and made idle. The rotor thus offers a resistance against the rotation of the gear only when the gear is rotated in one direction.

BRIEF DESCRIPTION OF THE DRAWINGS

The above and other objects and features of the invention will become more apparent from the following detailed description with reference to the accompanying drawings, wherein:

FIG. 1 is a front view showing an embodiment of the damper according to the invention;

FIG. 2 is a side view showing the damper of FIG. 1;

DETAILED DESCRIPTION OF THE PREFERRED EMBODIMENT

Figure 3:
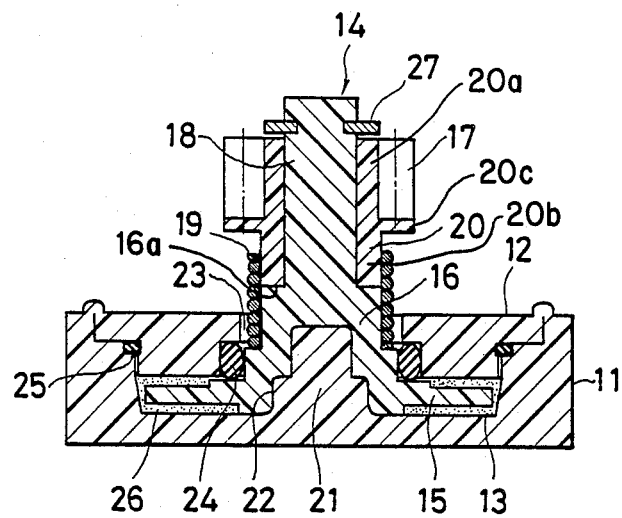
FIG. 3 is a fragmentary enlarged-scale sectional view of the damper of FIG. 1.
Figure 4:
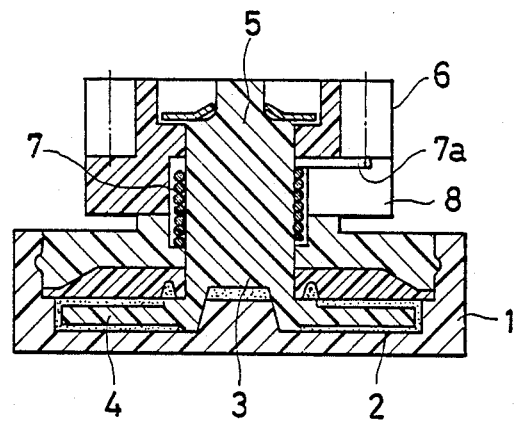
FIG. 4 is a view similar to FIG. 3 but showing a prior art damper.

FIGS. 1 to 3 illustrate an embodiment of a damper according to the invention. Referring to the figures, reference numeral 11 designates a casing, numeral 12 a lid member closing the opening of the casing 11 so as to form an oil pool 13 inside thereof, numeral 14 a rotor having a braking plate 15 accommodated within the oil pool 13 and a shaft 16 penetrating the lid member 12 to the outside of the casing, numeral 17 a gear rotatably mounted upon an extension 18 of the rotor shaft 16, and numeral 19 a clutch spring mounted upon a sleeve 20 supporting the gear 17 and the rotor shaft 16.

The casing 11 is disk-like and defines the oil pool 13 which has a circular or cylindrical configuration therein. The casing 11 also has a shaft-like projection or upstanding support 21 projecting upwardly from the center of the bottom wall thereof, the rotor 14 being rotatably mounted upon the projection 21. The rotor 14 has a recess 22 coaxially disposed with respect to the braking plate 15 and extending in the axial direction of the shaft 16, the recess 22 being slidably and rotatably fitted upon the projection 21 of the casing 11.

The lid member 12 is disk-like in shape and has a central through-hole 23 which is penetrated by means of the rotor shaft 16.

Before fittedly mounting the lid member 12 in or upon the casing 11, the rotor 14 is mounted within the casing 11 by inserting its shaft 16 and its braking plate 15 through the upper opening of the casing 11. The lid member 12 is then mounted with an O-ring 24 provided between it and the rotor 14 and also with another O-ring 25 provided between it and an annular stepped corner portion of the opening of the casing 11, thus sealing the oil pool 13 and hence oil 26 with the braking plate 15 immersed within the oil within the casing 11.

The gear 17 rotatably supported upon the extension 18 of the rotor 14 is retained thereon by means of a stopper or locking means 27. The sleeve 20 which is integrally formed with the gear 17 comprises, as best seen in FIG. 3, an upper axial portion 20a, a lower axial portion 20b, and an annular, radially outwardly projecting flange portion 20c, provided substantially midway along the axial length of sleeve 20 and extending outwardly from the external peripheral surface thereof, which supports gear portion 17. Rotor shaft portion 16 is also seen to include an annular shoulder portion 16a, provided substantially midway along the axial length of shaft 16, having a predetermined diametrical dimension, and it is further appreciated that the lower axial portion 20b of sleeve 20 which extends downwardly from the lower surface of the gear 17 is supported upon shoulder portion 16a of rotor shaft 16 and has the same outside diameter as the shouldered portion 16a of rotor shaft 16. It is further noted that the shouldered portion 16a of rotor shaft 16 is provided substantially midway along the axial length of rotor shaft 16.

The clutch spring 19 is a metal coil spring and is mounted upon the outer periphery of the shaft 16 about the shouldered portion 16a thereof, and also upon the outer periphery of the lower axial portion 20b of sleeve 20 supporting the gear 17.

The clutch spring 19 is tightly wrapped about the two shafts, that is, rotor shaft portion 16a and sleeve portion 20b. In this embodiment, its turns are in close contact with one another, and it is coiled about the two shafts 16a and 20b substantially over the entire length thereof.

While the damper according to the invention has the construction as described above, in this embodiment the casing 11 and lid member 12 are formed as a one-piece synthetic resin molding, while the rotor 14 and gear 17 are formed as respective separate one-piece synthetic resin moldings, these moldings being assembled together in the manner as described before.

Although the state of use of this damper is not illustrated, when it is used as a means for damping the movements of a door as is an ordinary damper of this type, a mounting stem 28 integral with the casing 11, as shown in FIGS. 1 and 2, is secured within the vicinity of the pivotal section of the door, and a sector gear, not shown, extending from the door side is meshed with the gear 17 so that the gear 17 can be rotated in the clockwise and counter-clockwise directions by means of the sector gear rotated with the operations of opening and closing the door.

In this use, when the gear 17 is rotated in the direction of storing the restoring force within the clutch spring 19, that is, the direction of pulling the opposite ends of the spring and reducing the diameter thereof, the spring is contracted in diameter along the axial extent thereof in contact with the gear sleeve 20 portion 20b and shouldered portion 16a. This contracting action is transmitted to the entire spring, that is, to the portion of the spring mounted upon the shaft 16a of the rotor 14, the rotation of which is damped by means of the braking plate 15. Consequently, the gear 17 and rotor 14 are directly coupled together, and a resistance is imparted to the rotation of the gear 17. The gear 17 is thus rotated gently and slowly, that is, the rotation of the door is damped.

When the gear 17 is rotated in the opposite direction, the spring 19 mounted upon the sleeve section 20b and rotor shaft section 16a is loosened. Thus, its close contact with the outer periphery of the sleeve section 20b and rotor section 16a is released so that it is made idle to permit free rotation of the gear 17 in an undamped mode.

It will be understood that with the arrangement of the gear 17 and sector gear, not shown, provided upon the door side such that the gear 17 is rotated in the direction of storing a restoring force within the clutch spring 19 with the rotation of the door in the opening direction and is rotated in the opposite direction with the closing of the door, any shock at the time of opening the door is damped, while the door can be closed smoothly without experiencing unnecessary resistance.

While a preferred embodiment of the invention has been described, according to the invention the clutch coil spring 19 for coupling together the rotor 14 and gear 17 is mounted as a mere helical coil spring upon both the rotor shaft 16 and sleeve 20 of the gear 17 having the same outer diameter. Therefore, loads are not concentrated upon any particular portion of the spring when the rotation of the gear is transmitted to the rotor while storing a restoring force within the spring. Thus, it is possible to provide a highly reliable product, which is free from damage to the spring and capable of withstanding abusive and prolonged use.

Furthermore, with the damper according to the invention, unlike the prior art damper, there is no need of providing any engagement portion at an end of the spring or a notch or the like within the gear for receiving such engagement portion of the spring, and hence there is no need of assembling together such engagement portion of the spring and notch of the year. Instead, it is only necessary to mount a coil spring upon the rotor shaft and gear sleeve having the same outer diameter portions. The assembly is thus simplified very much, and excellent production control can be obtained. Obviously, many modifications and variations of the present invention are possible in light of the above teachings. It is therefore to be understood that within the scope of the appended claims, the present invention may be practiced otherwise than as specifically described herein.

What is claimed is:

1. A damper, comprising:

a casing having oil contained therein;

a rotor, including a braking plate immersed within said oil disposed within said casing; and a shaft, having a predetermined axial length, extending substantially perpendicular to said braking plate from the center portion of said braking plate and projecting outwardly of said casing, said shaft having an external peripheral surface portion, having an external diametrical dimension, which is defined in part by means of an annular shoulder portion defined at an axial position which is substantially midway along said axial length of said rotor shaft;

a sleeve, having a predetermined axial length, rotatably mounted upon said rotor shaft and supported upon said annular shoulder portion thereof, having an external peripheral surface portion which has an external diametrical dimension substantially equal to said external diametrical dimension of said shouldered portion of said rotor shaft, and including an annular flange portion projecting radially outwardly from said external peripheral surface of said sleeve at an axial position which is substantially midway along said axial length of said sleeve;

a gear integrally mounted and supported upon said annular flange portion of said sleeve and disposed radially outwardly of said external peripheral surface portion of said sleeve; and a clutch spring tightly wound upon said external peripheral surface portion of said gear sleeve and said external peripheral surface portion of said rotor shaft along said substantially equal external diameter portions thereof.

2. The damper as set forth in claim 1, further comprising:

annnular cover means for enclosing said casing and said oil contained therein, and having a central aperture defined therein through which said rotor shaft projects such that said annular shoulder portion is disposed externally of said casing and said annular cover means.

3. The damper as set forth in claim 2, further comprising:

first O-ring seal means interposed between said cover means and said casing, and second O-ring seal means interposed between said cover means and said rotor, whereby said first and second O-ring seal means prevent leakage of said oil out of said casing.

4. The damper as set forth in claim 3, wherein:

said first O-ring seal means is disposed radially outwardly of said second O-ring seal means.

5. The damper as set forth in claim 2, wherein:

said annular cover means and said casing are both fabricated from synthetic resin material.

6. The damper as set forth in claim 5, wherein:

said annular cover means and said casing are integrally formed together as a one-piece molding.

7. The damper as set forth in claim 1, further comprising:

upstanding support means projecting vertically upwardly from a central portion of said casing; and hollow recess socket means defined within a lower portion of said rotor shaft for seating upon said upstanding support means of said casing, whereby said rotor is rotatably supported within said casing.

8. The damper as set forth in claim 7, wherein:

said hollow recess socket means defined within said rotor shaft is coaxial with said braking plate of said rotor.

9. The damper as set forth in claim 1, further comprising:

locking means mounted upon a distal end of said rotor shaft at an axial position along said axial length thereof which is spaced from said annular shoulder portion such that said gear sleeve is lockingly retained upon said rotor shaft between said locking means and said annular shoulder portion.

10. The damper as set forth in claim 1, wherein:

said rotor and said gear-gear sleeve assembly are fabricated from synthetic resin material.

* * * * *